United States Patent

[11] 3,587,906

| [72] | Inventor | William V. Pepe |
| | | Orange, Conn. |
| [21] | Appl. No. | 819,168 |
| [22] | Filed | Apr. 25, 1969 |
| [45] | Patented | June 28, 1971 |
| [73] | Assignee | ARC-CO Incorporated |
| | | Bridgeport, Conn. |

[54] ELECTRIC UTILITY BOX
4 Claims, 3 Drawing Figs.

[52] U.S. Cl. .................................................. 220/3.2,
220/22, 174/53
[51] Int. Cl. ........................................................ H02g 3/08
[50] Field of Search ............................................. 220/3.2, 22;
174/53

[56] References Cited
UNITED STATES PATENTS
1,555,533  9/1925  Vance ......................... (220/22UX)

| 1,920,811 | 8/1933 | Schwabacher | 220/3.2X |
| 1,929,844 | 10/1933 | Haas | 220/22 |
| 2,489,245 | 11/1949 | Sola | 220/3.2 |
| 2,942,749 | 6/1960 | Rosenberg | 220/22X |
| 3,472,945 | 10/1969 | Trachtenberg | 220/22X |

Primary Examiner—Joseph R. Leclair
Assistant Examiner—James R. Garrett
Attorney—Martin D. Wittstein ABSTRACT: A box for mounting a variety of electric utility devices in position for use, the box being adapted to be mounted in a masonry type wall. The box is of the multiple gang type and has a dividing partition therein for separating and defining individual compartments for both high and low voltage utility devices. The partition is confined between the undersurface of flanges extending along the top of the box and the ends of screws carried by the partition which are forcibly engaged with the bottom wall of the box.

PATENTED JUN 28 1971 3,587,906
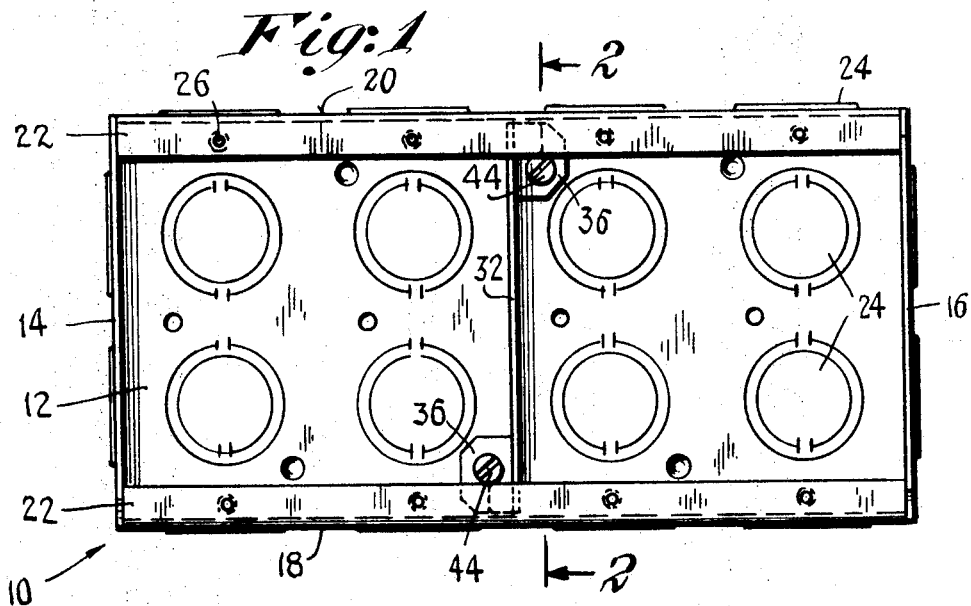
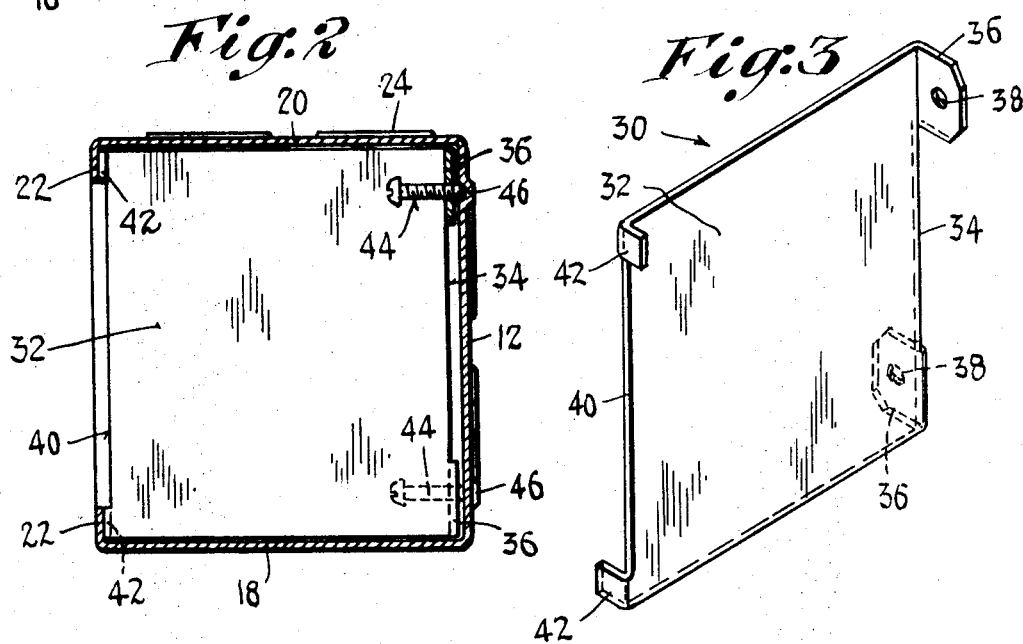
INVENTOR.
WILLIAM V. PEPE
BY Martin D. Wittstein
ATTORNEY

ELECTRIC UTILITY BOX

BACKGROUND OF THE INVENTION

The present invention relates generally to electric utility boxes and more particularly to those known as tile boxes which are adapted to be mounted in masonry walls and have provision for receiving and retaining a plurality of electric utility devices.

Multiple gang boxes of the type to which this invention relates have long been well known and generally comprise a substantially rectangular or any other known or desired shape boxlike member having a bottom wall, a plurality of sidewalls and an open top. The bottom and sidewalls are conventionally provided with a plurality of preformed knockouts the removal of which provides openings in the box walls through which electric wires pass for connection to utility devices mounted in the box. In addition, the top longitudinal edges of the box are provided with a relatively narrow flange to facilitate the mounting of the electric utility devices in the box by providing a mounting surface to which the devices can be screwed or otherwise fastened. It has been found that, in the case of tile boxes, the use of the continuous flange is the most economical way to provide a mounting means for the electric devices to be received in the box, even though other means have been used in nonmasonry boxes.

As is well known in the electrical field, the Underwriter's Laboratory code is very strict with regard to electrical components of the type with which the present invention is concerned. One requirement of the code is that multiple gang boxes shall have therein a suitable partition dividing the box into separate compartments where the box is being utilized to house electric utility devices involving different voltage levels. For example, if the same box has both 120- and 240-volt utility devices therein, the devices for each voltage level must be partitioned from those of the other level. Similarly, if the same box is utilized for both 120-volt house current type devices and 12 or 24-volt intercommunication equipment, the devices carrying these different voltages must be separated from each other by a suitable partition.

Previous attempts to provide a suitable partition which will meet the requirements of the Underwriter's Laboratory code and still be economical to manufacture have not been altogether successful. These attempts have been based either upon modifying standard boxes in the field, especially where the need for partitioning is not realized until well after an installation job has commenced, or upon providing a standard box which can be used either with or without a partition. One such attempt in the former category has been to secure a partition member to the bottom wall of a box by providing apertured tabs on the bottom edge of the partition member and securing these tabs to the bottom wall of the box by means of screws which pass through the tabs and into threaded holes formed in the bottom wall of the box. The significant disadvantage of this approach has been that the threaded holes in the bottom of the box must be drilled in the field after the box has been installed in the masonry wall for the reason that the Underwriter's code limits the number of holes or other openings which may be provided in a box during its manufacture, and the boxes are now generally manufactured with the maximum allowable number of holes for mounting purposes and water drainage, since most of the boxes manufactured are not used in such a manner that they require partitions. It will be apparent that it is extremely difficult to tap the required holes in the bottom of the box when the latter is surrounded with concrete, since, even after drilling, the concrete will still interfere with the tapping. In addition, even if the boxes could be manufactured with pretapped holes, the ones not used for mounting a partition wall would have to be plugged, along with other holes not used for mounting purposes, in order to prevent concrete from passing into the box, which necessitates further work in the field.

One example of a prior art attempt in the latter category is to mount dividing partitions in a multiple gang box without passing any securing members through the bottom of the box by wedging the dividing partition between the bottom wall and the undersurface of the flanges in the manner of a snap fit. Thus, opposed sidewalls of the box are provided during manufacture with inwardly extending closely spaced lances adjacent the bottom of the box to support and prevent lateral movement of the bottom edge of the dividing partition, and the flanges along the top of the box are provided with depressions or detents facing into the box. The dividing partition is positioned between the lances adjacent the bottom of the box and is pivoted into position and pressed under the detents in the flanges with a snap fit so as to be maintained in an upright position within the box. However, the principal disadvantage of this type of partition mounting is that the manufacturing tolerances of the flange depressions or detents is very close and cannot be maintained economically. On the other hand, if the manufacturing tolerance is not closely maintained, the partition wall is apt to become displaced and allowed to shift and make contact with a wire or terminal associated with a utility device in one of the compartments, thereby possibly causing a short circuit and/or fire.

SUMMARY OF THE INVENTION

It is a principal object of the present invention to provide a multiple gang box which can be partitioned so as to attain the advantages of the prior art partitioned gang boxes but without the attendant disadvantages thereof.

It is a further object of the present invention to provide a multiple gang box which can be easily partitioned in the field without the necessity of any changes or alterations in the present manufacturing techniques or construction of the boxes.

It is still a further object of the present invention to provide a multiple gang box which can be partitioned in the field without the necessity for drilling or tapping holes in the bottom of the box after installation thereof in a masonry wall.

It is yet another object of the present invention to provide a multiple gang box which can be partitioned in the field in such a manner that the partition wall is positively and forcibly secured in position in the box with no possibility of its becoming displaced.

These and other objects and advantages of the present invention are attained in one exemplary form of the invention in which a substantially rectangular box with bottom and sidewalls and an open top and longitudinal flanges is provided with at least one partition wall adapted to be secured in the box between the inner surfaces of the bottom wall and the longitudinal flanges. The partition wall is provided with means for forcibly and rigidly securing the wall in the box which comprises oppositely extending tabs disposed along one edge of the wall, each tab having a threaded hole therein for receiving a screw. The partition wall is placed in the box in a desired upright position and the screws are turned relative to the tabs to force the upper edge of the wall into tight engagement with the undersurface of the flanges. The partition wall is thus maintained in place by a force fit between the undersurface of the flanges and the bottom of the screws pressing on the bottom wall of the box, although the screws do not pass through the bottom of the box and no lancing is necessary.

A preferred embodiment of the invention will now be particularly described with reference to the accompanying drawings in which:

FIG. 1 is a plan view of a multiple gang box illustrating the principles of the present invention;

FIG. 2 is a side sectional view of the device of FIG. 1 taking along the line 2-2 of FIG. 1; and FIG. 3 is a perspective view of the dividing partition wall utilized with the gang box shown in FIG. 1.

DETAILED DESCRIPTION

Referring now to the drawings and particularly to FIG. 1; there is seen an electric utility box generally indicated by the reference numeral 10 and having a bottom wall 12, opposite end walls 14 and 16, and opposite longitudinal sidewalls 18 and 20. The box 10 is open a long the face opposite the bottom wall 12 except for the longitudinal flanges 22 which extend along each of the sidewalls 18 and 20 and overlie the interior of the box 10 for a relatively short extent.

As is customary in the art, the walls of the box are provided with a plurality of knockouts 24 which may be removed from the wall of the box to provide an opening through which the electric wire or cable passes to be connected to the utility device located in the box. The utility devices, which typically are plug-in outlets, switches, multiple wire junction or connector devices, etc., are secured in the box by means of suitable tabs formed on the devices which lie in contiguous relation with the flanges 22 and which have holes which register with the holes 26 formed in the flanges so that the utility devices may be rigidly secured to the flanges 22 after the box 10 has been installed in the concrete wall.

As indicated above, the particular type of box with which the present invention is concerned is the multiple gang type in which several utility devices may be mounted. In the illustrative box shown in FIG. 1, there is provision and space for four single size utility devices, each being mountable in association with one of the four rows of spaced knockouts 24. Also, as indicated above, if the utility devices to be used in any part of the box are substantially different in the voltage level carried by the corresponding wires, it is then necessary to separate the devices of such different voltage level by a partition wall which is fixedly secured in the box.

Thus, in accordance with the principles of the invention, a partition wall such as is generally indicated by the numeral 30 in FIG. 3 is provided which comprises a wall member 32 having an area substantially commensurate with the cross-sectional area of the interior of the box 10 with just a slight amount of clearance being lift so that the wall 30 can be easily placed in the box 10, in the manner hereinafter described. One edge 34 of the wall 30 is provided with oppositely facing tabs 36 each of which is provided with a threaded hole 38. As best seen in FIG. 1, the tabs 36 are shaped so as to avoid interferring with the knockouts 24 in the bottom wall 12. The opposite edge 40 of the wall 30 is preferably though not necessarily provided with smaller oppositely facing tabs 42 which provide a bearing surface for the wall 30 on the underside of the flanges 22 when the wall 30 is fully installed in the box.

A screw 44 is received in each of the threaded holes 38 with the head of the screw facing the open top of the box so as to be accessible therethrough. As best seen in FIG. 2, the bottom wall 12 of the box is preferably though not necessarily provided with depressions 46 located at the various positions where the partition wall 30 would be mounted in the box 10. The function of the depressions 46 is to prevent the screws 44 from shifting laterally relative to the bottom wall of the box when the screws are turned to tighten the partition wall 30 against the flanges 22.

It will be apparent from the foregoing that the manner of use of the present invention is that the box 10 is initially installed in a concrete or other masonry wall without regard to whether or not it need be partitioned. If the box is to contain utility devices of sufficiently different voltage levels that is must be partitioned, whether this decision is made before or after installation of the box in the masonry wall, the partition wall 30 is placed in the box and positioned so that the tabs 36 lie on the bottom wall of the box with the holes 38 juxtaposed with a corresponding set of depressions 46 formed in the bottom of the box. The partition wall 30 is then adjusted so that it is upright and aligned substantially parallel with the ends of the box, after which the screws 44 are turned in a direction to lift the partition wall from the bottom wall 12 and force it against the undersurface of the flanges 22 with sufficient force to firmly maintain the partition wall in the desired position.

It will now be evident that the present invention provides a partitioned multiple gang box which retains the desirable features of similar prior art devices and yet obviates or completely avoids the disadvantages thereof. As has been shown, the box 10 can be fabricated in the standard manner without any additional openings or lances for securing the partition wall 30 into place. Also, the box need not be drill and tapped in the field after installation in a masonry wall, so that there is no substantial additional labor involved in the event that a decision is made after installation of the boxes to utilize devices requiring different levels of voltage. Finally, it is evident that the partition wall is rigidly secured in position in the box 10 with no possibility of it becoming loose as the result of poor manufacturing tolerances or misfit of parts.

I claim:
1. An electrical junction box comprising:
   A. a boxlike body member having a bottom wall and a plurality of walls extending upwardly from said bottom wall, said body member being open on the face opposite said bottom wall,
   B. a relatively narrow inturned flange disposed along each of at least two opposed ones of said plurality of walls adjacent said open face of said body member;
   C. partition means disposed in said body member dividing the interior of said body member into at least two compartments, said partition means comprising a wall member extending from said bottom wall substantially to the interior surfaces of said flanges; and
   D. means fixedly securing said partition means in said body member between the interior surfaces of said bottom wall and said flanges, said means comprising extendable means carried by said wall member and adapted when extended to engage said bottom wall and force said wall member into engagement with the interior surfaces of said flanges.

2. An electrical junction box according to claim 1 wherein said extendable means comprises a screw threadedly engaged with at least one tab projecting laterally from the bottom edge of said wall member.

3. An electrical junction box according to claim 2 wherein said bottom wall includes a depression formed therein at the location where said screw engages said bottom wall thereby preventing lateral shifting of said screw when the latter is turned to force said wall member into fixed position said box.

4. An electrical junction box according to claim 3 wherein there are at least two oppositely projecting tabs formed on the bottom edge of said wall member adjacent the corners of said wall member, and there are depressions formed in said bottom wall corresponding to the locations of said screws for all positions which said wall member can occupy in said box.